Figure 18:
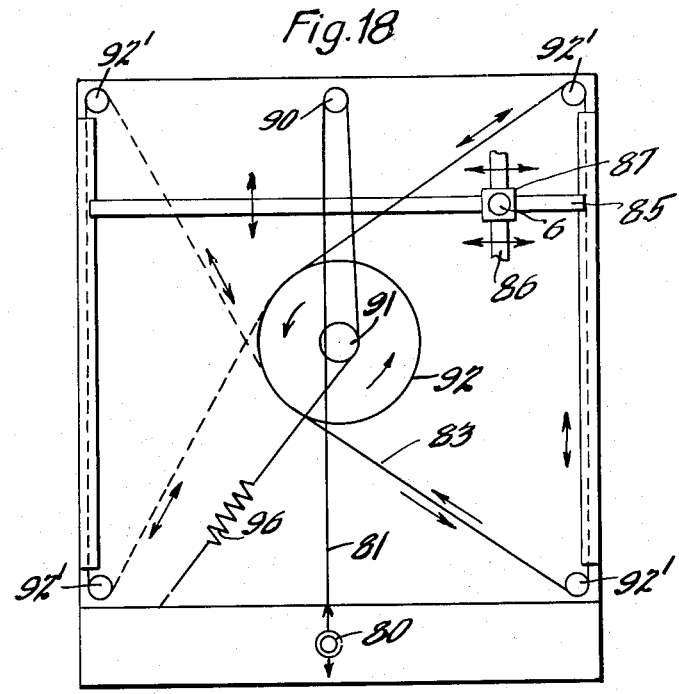

May 15, 1956 L. STANETZKI 2,745,216
MAGNETIC GAME APPARATUS
Filed Feb. 9, 1955 8 Sheets-Sheet 1
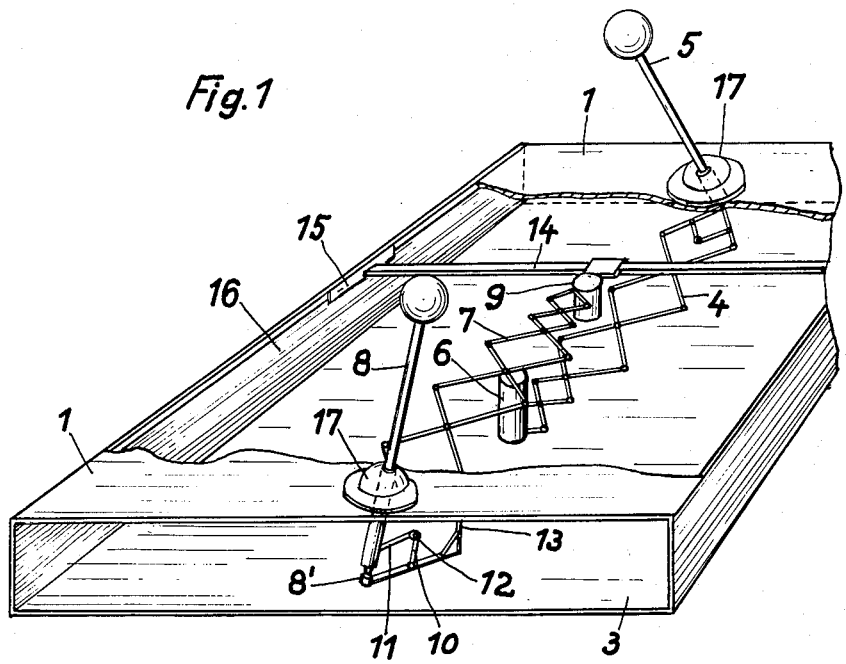
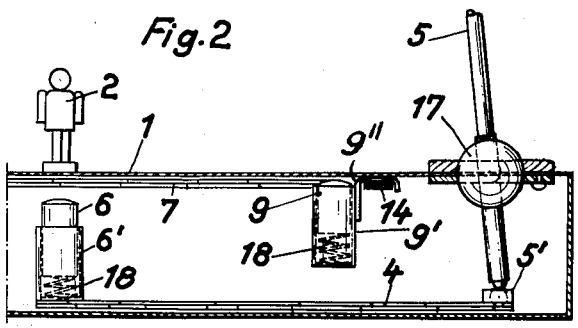
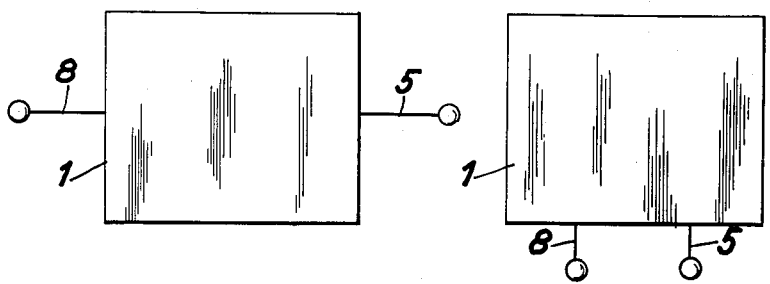
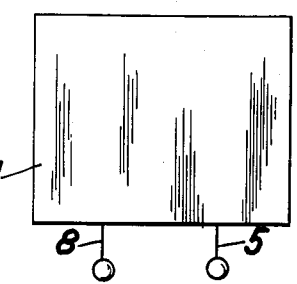
Inventor
Lothar Stanetzki,
By
Schneider & Dressler
Attorneys

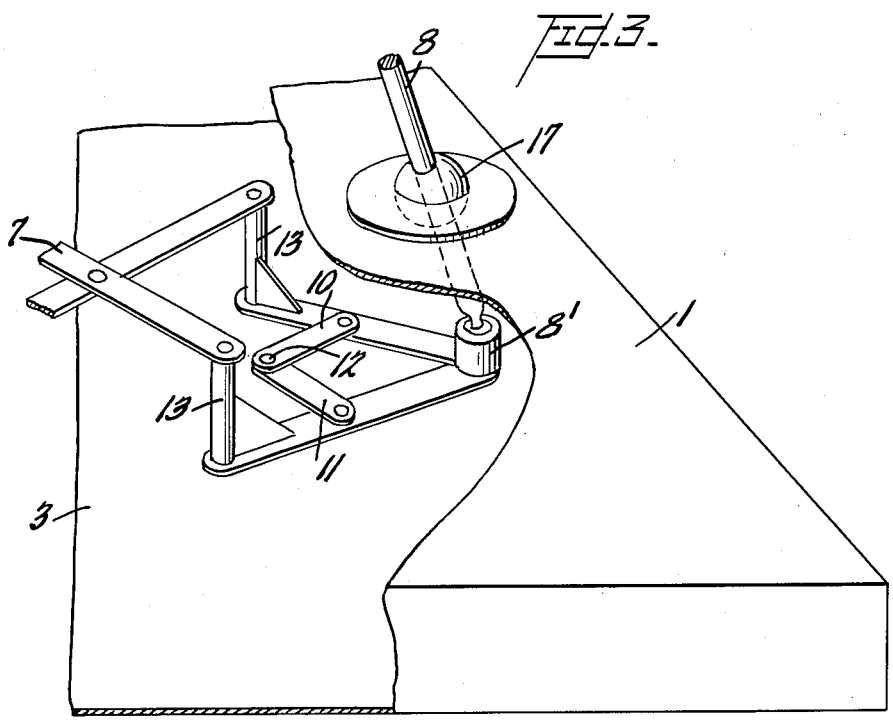
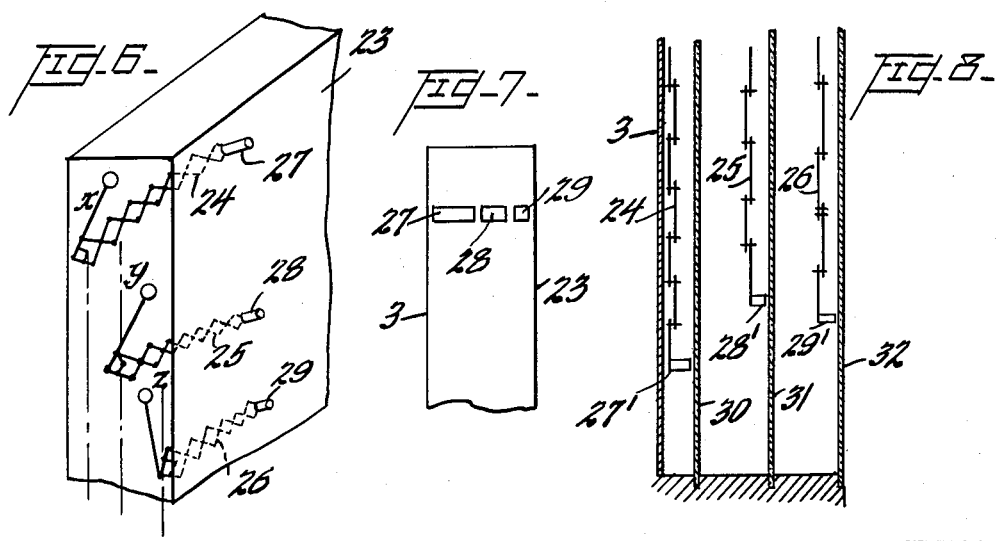

May 15, 1956  L. STANETZKI  2,745,216
MAGNETIC GAME APPARATUS
Filed Feb. 9, 1955  8 Sheets-Sheet 3
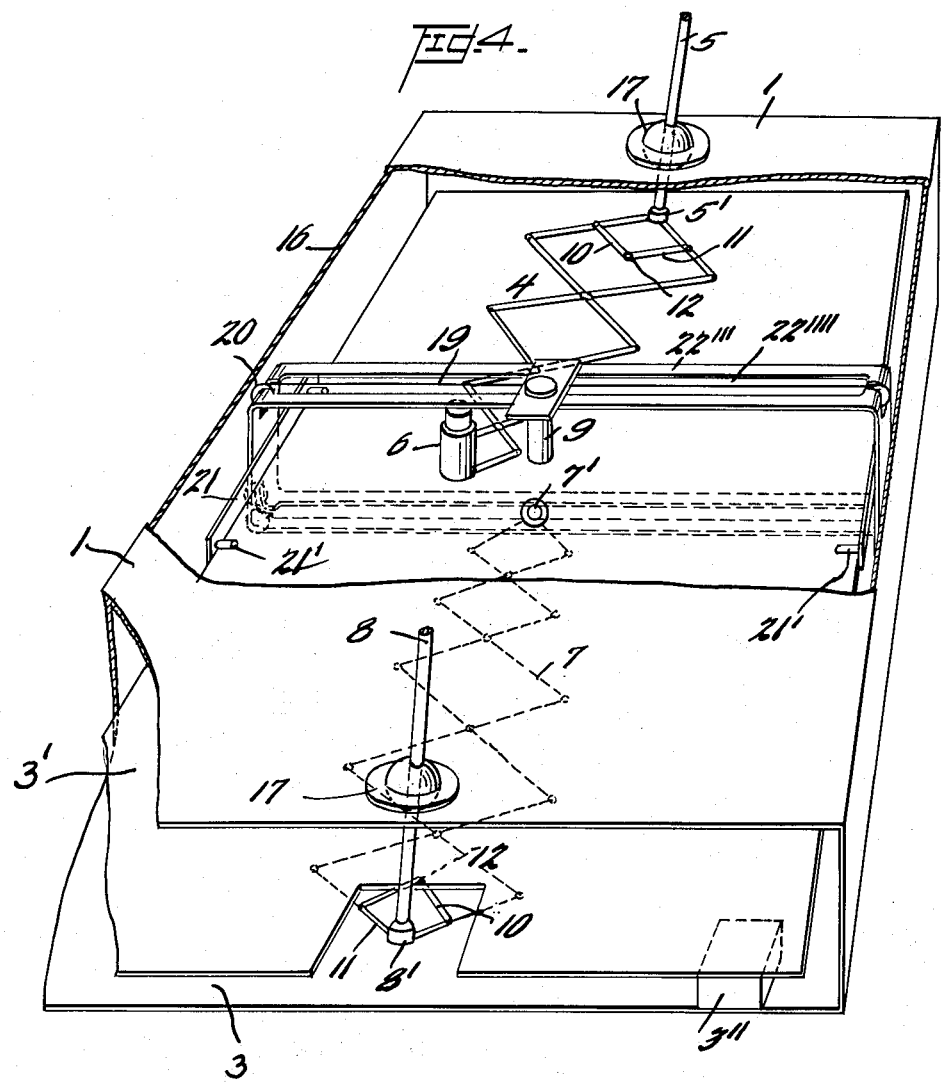
INVENTOR
Lothar Stanetzki,
BY Schneider&Dressler
ATTORNEYS May 15, 1956 L. STANETZKI 2,745,216
MAGNETIC GAME APPARATUS
Filed Feb. 9, 1955 8 Sheets-Sheet 4
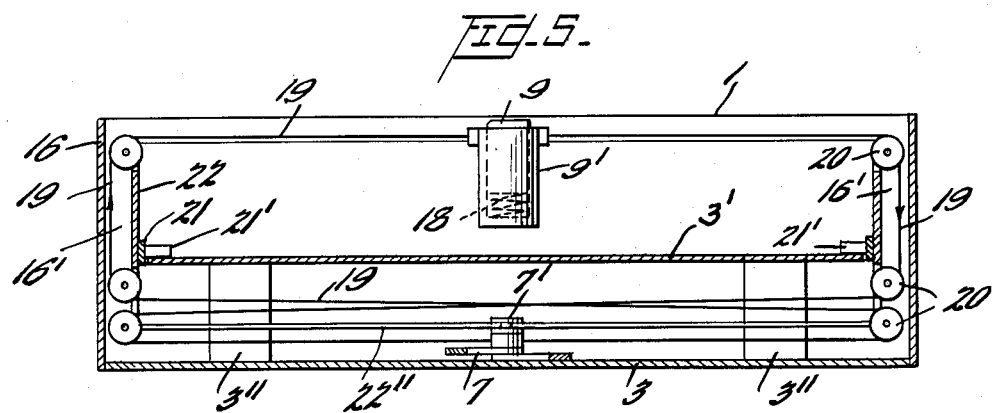
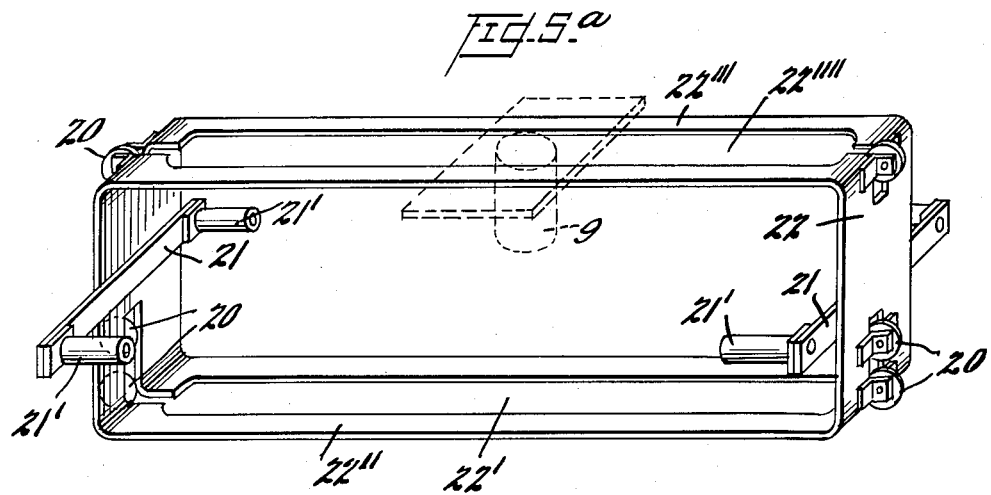
INVENTOR
Lothar Stanetzki,
BY Schneider&Dressler
ATTORNEYS

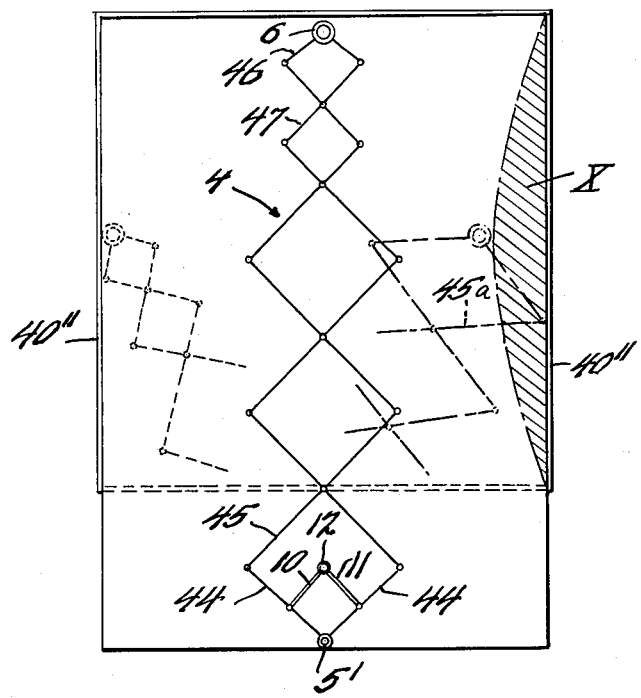
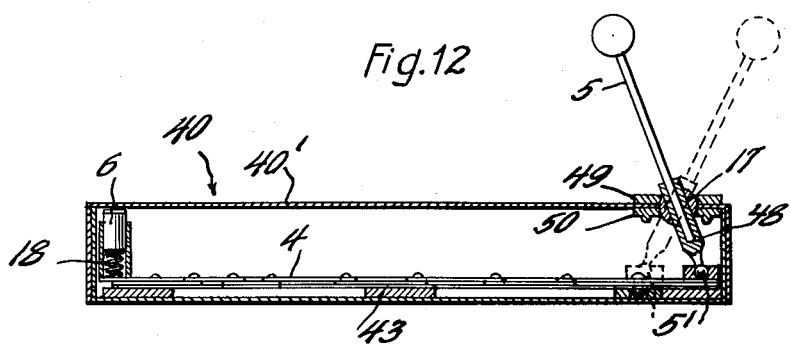

May 15, 1956 L. STANETZKI 2,745,216
MAGNETIC GAME APPARATUS
Filed Feb. 9, 1955 8 Sheets-Sheet 6
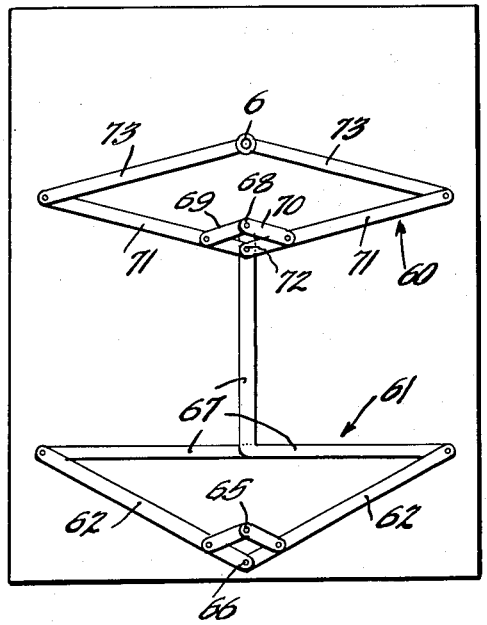
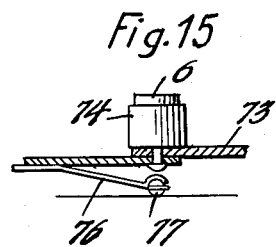
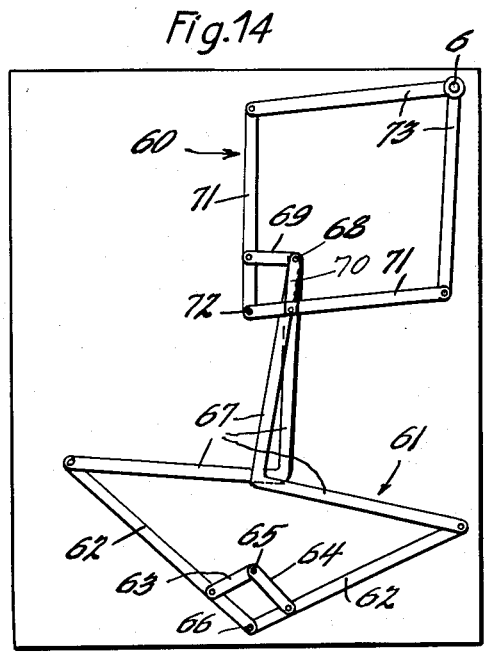
INVENTOR
Lothar Stanetzki,
BY
Schneider & Dressler
ATTORNEYS May 15, 1956     L. STANETZKI     2,745,216
MAGNETIC GAME APPARATUS
Filed Feb. 9, 1955     8 Sheets-Sheet 7
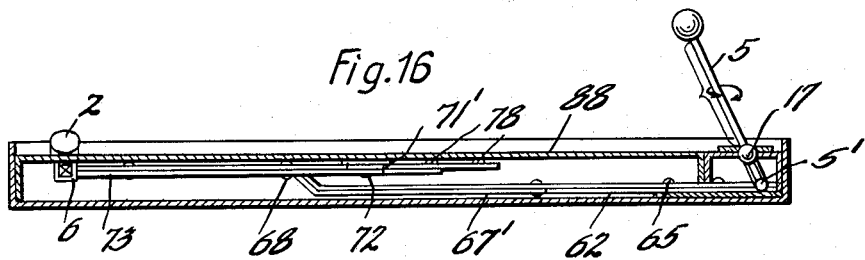
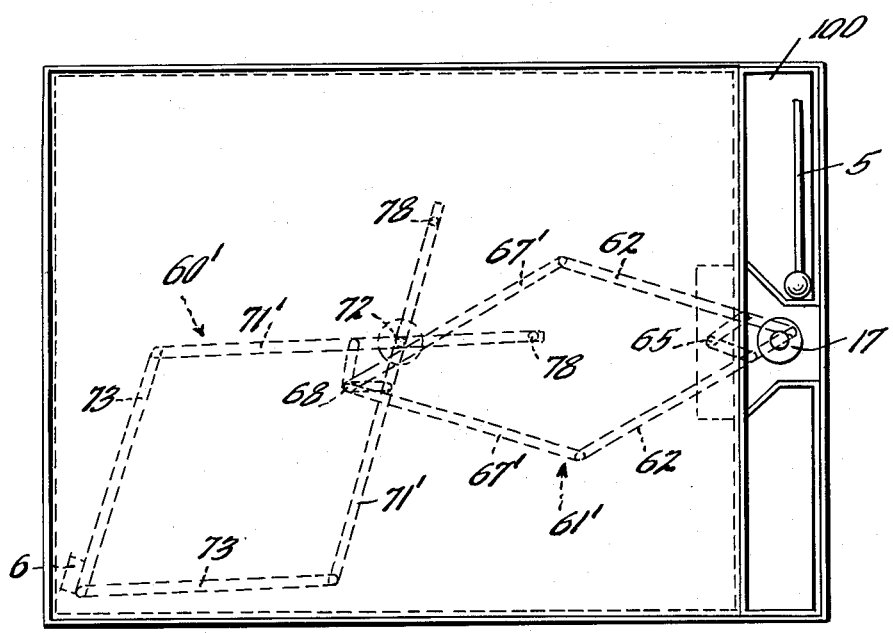
INVENTOR
*Lothar Stanetzki,*
BY *Schneider & Dressler*
ATTORNEYS May 15, 1956 L. STANETZKI 2,745,216
MAGNETIC GAME APPARATUS
Filed Feb. 9, 1955 8 Sheets-Sheet 8

INVENTOR
Lothar Stanetzki,
BY Schneider & Dressler
ATTORNEYS

United States Patent Office 2,745,216
Patented May 15, 1956

---

2,745,216

MAGNETIC GAME APPARATUS

Lothar Stanetzki, Bonn (Rhine), Germany

Application February 9, 1955, Serial No. 487,050

Claims priority, application Germany April 10, 1952

20 Claims. (Cl. 46—240)

This invention relates to magnetic toy or game apparatus of the type in which a magnetizable figure is moved on a playboard by a magnet disposed on the other side of the board and not visible to the player or players.

The present application is a continuation in part of my pending application Serial No. 344,493, filed March 25, 1953.

One object of the present invention is to provide manually operated concealed motion transmitting means for the magnet so constructed and disposed that the magnet, and hence the figure moved thereby, follows the pattern of movement of a single operating handle in the same direction therewith but at an increased substantially constant ratio throughout the range of the playboard.

Another object is to provide a playboard of the character above indicated in the form of a comparatively shallow box or container in which the motion transmitting mechanism for the magnet is mounted, and carrying an operating lever universally pivoted or fulcrumed in the top of the box, so as to divide the lever into an exterior long arm and an interior short arm, said short arm operating motion amplifying transmitting mechanism to the magnet, thus providing sufficient range of movement for the magnet from a comparatively small range of movement of the interior arm of the lever, while the handle of the exterior arm obtains sufficient leverage to promote ease of operation.

In one embodiment of the invention the motion transmitting means may be in the form of lazy tongs disposed so as to expand and contract in a lineal direction and to pivot in a transverse direction, both of these movements being produced by a single manual operating lever movable in the same direction in which the magnet is being moved.

Another object is to provide, in a playboard device of the character above described, lazytongs motion transmitting means disposed beneath the playboard top, and so constructed and arranged as to enable the magnet carrying extremity thereof to range throughout the area of the board without hindrance from the side walls of the playboard box.

A further object is to provide in a playboard of the character above described lazytongs motion transmitting means for amplifying the movement of the manual control lever, with linked connections for pivoting the lazytongs about a pivot located within the parallelogram adjacent the operating lever, so as to increase the amplification ratio without extending the lazy tongs to an undue length.

Another object is to provide in a playboard of the character above indicated, lever operating means of such construction and mounting that the point of connection with motion transmitting means always moves in the same plane, so as not to interfere with the planar movement of the motion transmitting means.

Another object is to provide a playboard of the character above specified in which an operating lever mounted for universal movement is made in two sections one of which may be demounted so as to free the playboard from protuberances when the board is to be stored or shipped.

A further object is to provide an apparatus of the type referred to which is particularly interesting, offering new possibilities of arranging various games.

A special object of the invention is to provide an apparatus which can be used for demonstration and teaching purposes, permitting, for instance, to reproduce the condition of road traffic or sporting events.

According to some embodiments of the present invention two or more figures may be moved completely independently of each other, each by a separate magnet, in any two-dimensional directions, in such a way that their movements may intersect each other without interfering with the movability of the figures. To this end, according to the present invention a plurality of, and more particularly, two, magnets may be arranged on the back side of the playboard, on separate motion transmitting means which are capable of sweeping the entire back side of the playboard without mutual interference.

Where my novel play apparatus is provided with two magnets disposed below a horizontal or nearly horizontal playboard, it may be constructed in such a way that one of the magnets is arranged in an upright position on the free end of a per se known transmission device for the control motion, such as pantograph mechanism, a lazy tongs device, or the like, while the free end of the other transmission device acts upon a two-dimensional guide, such as a compound rest slide guiding way, from which the other magnet is suspended below the playboard.

In this connection, it may be advantageous to arrange below the playboard a board or bottom wall which serves as a support for the first motion transmitting device for the control movement and preferably also for the two-dimensional guiding way of the second transmission device, which latter is preferably arranged below this bottom wall.

It is also contemplated, within the purview of the present invention, to arrange each of the magnets behind a vertical or nearly vertical playboard on a per se known motion transmitting device for the control movement, the planes of action of these motion transmitting devices being arranged one behind the other, parallel to the playboard.

In such an embodiment it may be advantageous to graduate the intensity of the magnets in accordance with their distances from the playboard.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a perspective view, partly broken away, of a playboard illustrating one preferred form of the invention adapted for two players, Fig. 2 is a longitudinal sectional elevational view of the form illustrated in Fig. 1, Fig. 3 is a fragmental perspective detail view, illustrating more clearly the lazy tongs mounting and connection with the control lever, Fig. 4 is a perspective view similar to Fig. 1 showing a modified form, Fig. 5 is a transverse sectional elevational view of the form illustrated in Fig. 4, Fig. 5a is a detail perspective view of the slide rest illustrated in Figs. 4 and 5, Fig. 6 is a perspective view of a further modified form including a vertical playboard, Fig. 7 is a diagrammatic elevational top view of the form illustrated in Fig. 6 showing the relative position of the magnets, Fig. 8 is a diagrammatic horizontal sectional view showing a further modification, Fig. 9 is a diagrammatic view showing a possible arrangement of the control elements, Fig. 10 is a similar view showing another arrangement of the control elements, Fig. 11 is a diagrammatic plan view illustrating a preferred form of lazy tongs motion transmitting device for the control magnet, Fig. 12 is a longitudinal sectional elevational view of a magnetic game board device in which the lazy tongs device illustrated in Fig. 11 is applied.

Figure 20:
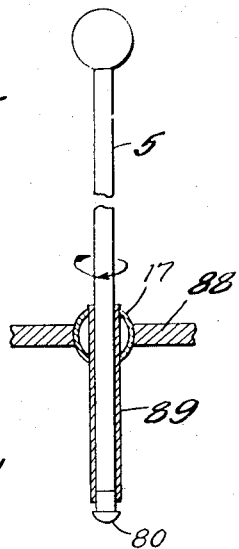
Figure 19:
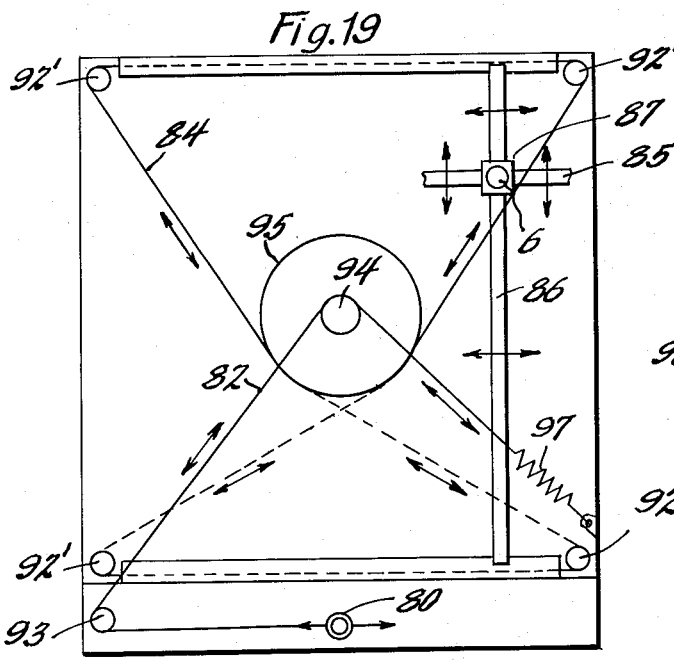
Figure 21:
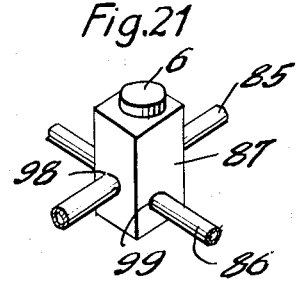

Fig. 13 is a diagrammatic plan view of another embodiment of the improved manually operated motion transmitting means for the control magnet, Fig. 14 is a view similar to Fig. 13 illustrating the motion transmitting means in another position relative to the game board, Fig. 15 is a fragmental elevational detail view partly in section illustrating one form of guiding means which may be used for biasing the magnet toward the interior side of the game board, Fig. 16 is a longitudinal sectional elevational view and Fig. 17 is a plan view of a playboard provided with a modified form of motion transmission mechanism of the general type illustrated diagrammatically in Figs. 13, 14, Fig. 18 is a diagrammatic plan view of a different form of motion transmitting mechanism showing the portion of the mechanism for transmitting movement to the magnet longitudinally of the playboard, Fig. 19 is a view similar to Fig. 18 along another plane showing the mechanism for transmitting movement to the magnet in a direction transverse of the playboard, Fig. 20 is a fragmental sectional elevational detail view illustrating a slightly modified form of the manual control lever, and Fig. 21 is a fragmental perspective detail view of the guide block and guide rods for the magnet illustrated in Figs. 18, 19.

Referring in detail to the drawings, particularly to Figs. 1 and 2, a playboard made of non-magnetic material is provided with a figure or figures 2 freely mounted thereon so as to be moved through magnetic attraction exerted by a movable magnet 6. Disposed on a bottom wall 3 of the playboard is a motion transmitting device consisting of a lazy tongs member 4, one end of which is connected by a universal joint, such as a ball and socket device 5', to an operating, or control lever 5 universally pivoted by means of a ball joint 17 mounted in a socket formed in the top of the board. The other end of the lazy tongs member 4 carries the magnet 6 in a position below the top of the play board so as to exert an attractive force on any figure 2 disposed thereover within the magnetic field of the magnet. These figures 2 are provided with magnetizable material is is well known in the art.

Arranged directly below the play board 1 is a second pair of lazy tongs 7 which can be operated by a second control lever 8; the free end of said second pair of lazy tongs carries a second magnet 9 hanging below the playboard 1.

The ends of the lazy tongs 4 and 7 jointed to the control levers 5 or 8 are mounted on the bottom wall 3 by means of a stationary pin 12 through swingable links 10, 11, Fig. 3. The swingable links 10 and 11 together with the first arms of each of the lazy tongs devices 4, 7 form a parallelogram system which serves for transmitting the movements of the control levers to the lazy tongs, through universal joint connections 5', 8'. By reason of the proximity of the pivot 12 to point of power application 5', 8', and connections 10, 11 to the first arms of the lazy tongs, an increased amplified motion is imparted to the magnets 6 and 9. The amplification of motion transmitted to the first arms of the lazy tongs is particularly evident from a study of the diagrammatic illustration in Figure 11. It is noted in that figure that the links 10, 11, together with the portions of arms 44 adjacent to the point of power application 5' form a smaller first parallelogram to which power is applied. The same angular extent of movement being transmitted to the crossed arms or links 45, which form larger parallelograms, results in an increased motion amplification beyond that attained in the usual form of lazytongs composed of parallelograms of equal size starting from the point of power application.

This reduction of size of the first parallelogram to which power is applied makes it possible to sweep the entire length and breadth of the playing surface of the playboard by the magnet without requiring excessive movement of the operating handle. Furthermore, owing to this proximity of the stationary pivot 12 to point of power 5', and reduction in size of the first parallelogram, the inner arm of operating lever 5 may be made short, thus reducing the required depth of the playboard box to a practical proportion. However, notwithstanding the proximity of the point of power application 5' to stationary pivot 12, very little pressure is transmitted against the pivot 12 as socket 5' is moved forward and backward by the operating lever. The force exerted by lever 5 through socket 5' is applied directly to arms 44 to move them bodily along the bottom wall of the box, easily overcoming the force of friction of rest exerted on the lazytongs links sliding on the surface of bottom wall 3. The links 10 and 11 consequently swing easily about stationary pivot 12, without transmitting any substantial amount of pressure or tension to the pivot.

The last crossed links and terminal links of the lazy tongs carrying the magnets 6 or 9 are shorter than the rest of the crossed links and arms, in order to ensure that even with contracted tongs the magnets are able to sweep the playboard completely up to its side walls, as will hereinafter appear in connection with illustration in Figs. 11, 12.

Preferably, each of the magnets 6 and 9 is slidably held in a cup or sleeve 6' or 9', Fig. 2, under action of a compression spring 18 urging its associated magnet toward the playboard 1. A strip 14 is slidably mounted in the side walls 16 of the casing, by means of members 15, for suspending the sleeve 9' by means of a bracket 9" engaging over the strip 14 by a U-shaped bend slidable thereon.

The lazy tongs member 7 is disposed close to the bottom surface of the top wall, thus not unduly increasing the amount of clearance required to enable the magnet 6, carried by lazy tongs 4 to move freely past lazy tongs 7. Magnet 6 may therefore sweep the entire surface of the playboard without materially increasing the air gap between it and any magnetic object which is to be moved thereby over the top surface of the playboard. It may be noted from Figs. 1, 2 and 3 of the drawings that the links of the lazy tongs as well as guide strip 14 are sufficiently thin so as not to take up any considerable space in a direction perpendicular to the top wall of the playboard.

For the purpose of connecting the first arms of lazy tongs 7 with the adjacent crossed links thereof which are disposed close to the top wall of the playboard box, posts 13, as shown in Figs. 2 and 3 are secured to the extremities of the first arms, pivots being formed at the tops of these posts to which the adjacent extremities of the crossed links are jointed. An angular gusset may be provided at the base of each of the posts 13 to hold it firmly in upright position on its respective first arm.

It will be seen that owing to the pivotal mounting of the levers in the top wall of the playboard and the connection of the lower arms of the levers with the ends of the lazy tongs, any movement of the handle of the control lever will be transmitted to the corresponding magnet in the same direction, but in an amplified degree, throughout the range of the playboard. Furthermore owing to the mounting of the two lazy tongs members 4 and 7 in different planes there will be no interference between the two motion transmitting devices, so that each of the two magnets may be moved throughout the range of the playboard without hindrance from the other.

According to the modification diagrammatically shown in Figs. 4, 5, and 5a, one of the transmission devices for the steering movements of the control lever, e. g., the set of lazytongs 4 with the upright magnet 6 may be arranged on an intermediate bottom wall 3' supported on the bottom wall 3 by means of spacing members 3", in such a way that a gap 16' is left between the intermediate bottom wall 3' and each of the side walls 16 of the casing 3, 16, 1. The second transmission device, e. g., the second set of lazy tongs 7, which is jointed to the second control lever 8, on the other hand may again be arranged on the bottom wall 3. The free end of this set of lazy tongs 7 carries a pin 7' whose reduced upper end is guided in a longitudinal slot 22' of the lower leg 22" of a compound slide rest 21, 22 which by means of carrier pins 21' is slidably guided on the longitudinal edges of the intermediate bottom wall 3'. The upper leg 22''' is provided with a longitudinal slot 22'''' which is symmetrically arranged above the longitudinal slot 22'. The leg 22" of the compound slide rest is disposed below, and the leg 22''' above the intermediate bottom wall 3'. The longitudinal slot 22'''' serves for holding and guiding a pot-shaped casing 9' for a magnet 9 which is urged against the playboard by a spring 18.

The pin 7, of the set of lazy tongs 7 and the casing 9' of the magnet 9 are interconnected by a cable, cord, or strip member 19 which is guided over deflecting rollers 20 of the compound slide rest 21, 22, in such a way that a movement of the control lever 8 causes a movement in the same direction of the magnet 9, by transmission through the set of lazy tongs 7, the pin 7' and the cable or the like 19.

It will be noted that in the embodiment shown in Figs. 4, 5 and 5a the two magnets 6 and 9 also do not interfere with each other as to their movements, the upper guide leg or strip 22''' being so thin as not to increase unduly the air gap between magnet 6 and the adjacent surface of the top wall required for clearance to enable magnet 6 to pass freely under the guide strip. Thus each magnet 6 and 9 may be operated to sweep the entire play area of the playboard without interference from the other.

In the modification shown in Figs. 6 and 7 the playboard 23 is arranged in an upright position, and lazytongs 24, 25, 26 are arranged behind it, parallel to the playboard, in three planes x, y, z disposed behind each other, for transmitting the control movements upon three magnets 27, 28, 29.

The vertical position of the playboard 23 offers the advantage that only forces acting in the planes of motion of the magnets are transferred to their transmission devices, so that mutual collisions cannot occur. The transmission devices, therefore, can be of a relatively light construction, which offers the further advantage that they require only little space in their initial position and thus do not confine the extension of the playboard from the outset.

The transmission devices may be under action of springs or counterweight, not shown, for compensating their own weight.

The modification with vertical playboard is particularly adapted for educational and training purposes, since the vertical playboard can be suspended or put up in the form of a blackboard, in such a way that it is visible for everybody, even in a larger room.

As indicated in Fig. 7, especially in case of such a construction the intensity of the magnets 27, 28, 29 may be graduated in proportion to their distance from the playboard 23.

However, as will be seen from Fig. 8, it is also possible to provide a plurality of parallelly disposed playboards 30, 31, 32 etc. consisting of a transparent, non-magnetic material, in such a way that each of these playboards is associated with one of the magnets 27', 28', 29' and transmission devices.

The control elements, e. g., the control levers 5, 8 may be arranged on opposite sides of the playboard 1, as indicated in Fig. 9, so that preferably two players or parties are able to play with each other. However, it is also possible to arrange the control levers on the same side of the playboard, as illustrated diagrammatically in Fig. 10, so as to enable a single player to control various figures from one point. This modification again will be used primarily for educational purposes.

In each of the illustrated embodiments the control levers are constructed with two arms in order to be able to control the magnets in conformity with the directional movements of the control levers as hereinabove described.

In the form of the invention illustrated in Figs. 11, 12, the playboard 40 having a top member 40' is provided with a single lazytongs device 4, resting on the bottom wall 43. Operatively connected at one end of the lazy tongs by means of a ball and socket joint 5' disposed at the extreme point of articulation of the first pair of arms 44 is an operating or control lever 5, similarly to the corresponding elements described in connection with Figs. 1, 2. At the opposite end of the lazytongs 4 is mounted a cup or sleeve 6' carrying a magnet 6, yieldably urged toward the under side of the playboard top by means of spring 18. A pair of links 10, 11, are pivoted respectively at one end to arms 44, and at the opposite ends thereof are articulated together and pivoted on a stationary pivot 12. Thus when lever 5 is moved from the solid line position to the dotted line position in Fig. 12, the toggle 4 is contracted, thus moving the magnet 6 to the right, in the same direction to which the lever handle has been moved. However owing to the toggle transmission the movement of the magnet is considerably amplified as compared with the movement of the handle. Also, when the lever is moved laterally, for example to the left of the playboard as seen in Fig. 11, thus moving socket 5' to the right, magnet 6 will also move to the left, as shown in dotted lines; but such movement will be amplified as compared with the movement of the handle, by reason of the greater distance that the magnet is disposed with respect to the pivot or fulcrum 12. By reason of the location of the fulcrum 12 within the first parallelogram close to socket 5', where the power is applied, an increased amplification ratio is secured as hereinabove noted.

For the purpose of securing complete coverage of the playboard by the magnet, so that it may reach any portion of the playboard, the crossed arms or links 47 and adjacent terminal links 46 at the extremity of the lazytongs at which the magnet is carried are made of shorter length respectively than cross arms or links 45 and first arms 44, respectively. This can be seen from the dotted line position shown at the left of Fig. 11, as compared with the position of a form of lazytongs in which the length of the crossed arms or links is the same throughout, as shown in dot and dash lines 45a at the right in Fig. 11. It will be noted that the articulation of the last crossed link and adjacent terminal link in the dot and dash form strikes the side wall at the interior of the board, preventing the magnet from reaching an area X, represented by the hatched lines. However, by decreasing the length of the last crossed arms or links 47 and adjacent terminals links 46 the magnet can reach clear up to the side wall 40'', as shown in the dotted line position at the left in Fig. 11.

Attention is directed at this point to the form of articulation of lever 5 with the top 40' of the playboard. Lever 5 is formed in two telescoping parts, the inner part 48 of which is in the form of a sleeve or socket passing freely through a central aperture in ball member 17. The latter is mounted in a pair of bearing rings 49, 50 forming a socket for the ball so as to constitute a universal joint therewith. Thus, irrespective of the position of lever 5, its lower extremity having a universal joint connection with the end of lazytongs member 4, always follows the plane of the lazytongs and maintains easy operating engagement therewith.

To facilitate ease in shipping or storage the upper portion of lever 5 may be removed from sleeve portion 48, rendering the device free from projecting parts, so that it may be readily packed. Furthermore, by reason of the sliding fit between sleeve portion 48 and ball member 17, the entire top 40' may be raised to obtain easy access to the mechanism in the interior of the playboard. This feature of providing a removable top may be adopted in all of the forms of the invention described herein.

Referring now to the form of the invention illustrated in Figs. 13–15 of the drawings, the magnet 6 is supported by a parallelogram lever system or pantograph 60, which in turn is actuated by a second parallelogram lever system or pantograph 61. Arms 62 of pantograph 61 are connected by two links 63, 64 respectively pivoted thereon and articulated together at their other ends upon a stationary pivot 65. The outer extremities of arms 62 are articulated together at 66 and engaged at that point by a universal ball and socket connection with the lower extremity of lever 5, as shown in Fig. 16 in substantially the same manner as shown in the other forms of the invention above described.

Arms 62 are respectively pivoted to arms 67, which are articulated together at 68 to a common pivot at which a pair of links 69, 70 are articulated. Links 69, 70 are respectively pivoted to arms 71 of parallelogram lever system 60, which is pivoted to a stationary pivot 72 at the common articulation point of arms 71. Arms 73, completing parallelogram 60, are articulated together at their outer extremities, at which point magnet 6 is carried.

From the above description it will be seen that the two parallelogram lever systems 60, 61 transmit an amplified movement to the magnet 6 when manual lever 5 is operated, and cause the magnet to follow the same direction in which the lever handle has been moved. Thus when lever 5 is moved forwardly as shown in Fig. 16, thus moving point 66 rearwardly, the parallelogram 61 is expanded in a longitudinal direction from the position shown in Fig. 13. Arms 67 connected to articulation point 68 of links 69, 70, in turn cause parallelogram 60 to expand in a longitudinal direction, thus transmitting an amplified forward movement to the magnet 6. Similarly when handle 5 is moved to the right in Fig. 13, causing point 66 to move to the left from the position shown in Fig. 13 to the position shown in Fig. 14, parallelogram 61 is caused to pivot about stationary pivot 65, thus transmitting an amplified movement to point 68 to the right. The connection at point 68 with links 69, 70, causes parallelogram 60 also to pivot to the right about pivot 72, thus transmitting an increased amplified movement to magnet 6 in the same direction in which the handle 5 has been moved.

Referring to Fig. 15, it will be noted that magnet 6 is carried in a cup or sleeve 74 at the point of articulation of arms 73 of parallelogram 60. A resilient finger 76 may be attached to an arm 73 to extend downwardly into engagement with the bottom wall of the playboard thus resiliently biasing the magnet toward the top wall of the playboard. An antifriction ball 77 may be provided at the extremity of finger 76 to roll upon the bottom wall of the playboard and thus reduce the friction therewith.

The modified form illustrated in Figs. 16, 17, is closely similar in principle to the form illustrated in Figs. 13, 14. The same numerals used in Figs. 13, 14 are used to designate similar parts in Figs. 16, 17, primes being added, where parts are modified. The principal variation disclosed in these figures is in the means for guiding or biasing the magnet. To this end, arms 71' of parallelogram 60' are extended beyond stationary pivot 72 and are provided with antifriction bearing balls 78 rolling against the interior surface of the top of the playboard. In this way the magnet 6 is biased so as to maintain its close position with respect to the top of the playboard in all of the positions to which it may be moved by the operation of lever 5.

It will be noted that arms 67' corresponding to arms 67 of Figs. 13, 14, are straight instead of angular. However the exact shape of these arms may be chosen so as to conform to mechanical requirements and does not affect the general operation of the device in regard to the transmission of the desired movement to the magnet. However, in order to prevent possible interference between arms 67' of parallelogram 61' and arms 71' of parallelogram 60', the two parallelograms are disposed over one another in two different planes, as shown in Fig. 16. The extremities of arms 67' may be bent upwardly for engagement with articulation 68 of links 69, 70.

In order to facilitate packing of the playboard for storage or shipment a compartment 100 (Fig. 17) may be provided in which the handle 5 removed from the lower sleeve member may be placed. The magnetic figures used on the playboard may also be stored in the same compartment.

In the forms illustrated in Figs. 13, 14, 16, 17, fixed pivot 65 and movable articulation 66 operated by lever 5 may be interchanged if so desired. Thus, articulation 66 may be on a stationary pivot and the lever 5 may be universally connected at articulation point 65. When this is done, the connection of links 67 and 67' to articulation 68 is likewise shifted to articulation point 72, and the stationary pivot for parallelogram 60 is shifted from point 72 to articulation point 68. In this way the direction of movement of magnet 6 is maintained to follow exactly the direction of movement of the operating handle, exactly as in the forms illustrated.

A different motion transmitting arrangement is shown in Figs. 18 and 19, the movement of point 80 at the lower extremity of the handle 5 being transmitted by cords 81, 82, 83, 84 acting upon two rods 85 and 86, respectively, that are movable parallel to themselves and at right angles to each other. At their crossing point a sleeve 87 supporting the magnet 6 is arranged. According to Fig. 20 the handle 5 is supported in a ball joint 17 disposed in a socket within the top of the playboard 88 and may be swivelled in all directions. The handle or lever 5 is provided at its lower end with a sleeve or socket 89 within which handle 5 is removably telescoped. At its lower extremity sleeve 89 carries a pin 80 to which the cords above described are attached. In Fig. 18 the actuation in a forward and rearward direction is shown. Cord 81 fixed to pin 80 is trained over a pulley 90 onto a small wheel or pulley 91, turning the latter wheel against the action of a spring or other resilient means 96 in one direction, the movement in the other direction being effected by the resilient force of the means 96. On the axle of the wheel 91 a disk of larger diameter 92 is arranged around which the cord 83 is trained. The latter is guided over pulleys 92' and is connected to rod 85 to transmit thereto an amplified movement in a forward or rearward direction in accordance with the forward or rearward movement of lever 5.

In the same manner, according to Fig. 19, the rod 86 is movable laterally. For this purpose cord 82 is trained over pulleys 93 and 94 and moved against the action of a spring or other resilient means 97 fixed to the case of the toy. Upon the axle of pulley 94 a disk 95 is arranged over which a cord or chain 94 is trained and connected to the ends of rod 86 to transmit an amplified movement in a transverse direction to the right or left to follow the right and left movement of lever 5. As shown in Fig. 21 there is arranged in the crossing point of the rods 85 and 86 a block or sleeve 87 bearing the magnet 6 having openings 98 and 99 for the passage of rods 85 and 86, respectively. By means of this arrangement the magnet 6 may be moved across the whole range of the playboard. With this arrangement in the same manner as in former figures means may be provided to secure the pressing of the magnet to the underside of the top of the playboard.

The choice of the ratio of diameters of the pulleys 91, 94 at one side and the disks 92, 95 at the other side gives the correspondent transmitting ratio, so that with relatively small movements of the handle the magnet may be moved over greater distances. By means of the rubber or spring tensioned means 96, 97, the magnet 6 will be brought back automatically to an initial position which may be marked on the playboard whenever the handle 5 is released, so that if the magnet releases one of the toy figures on the gaming square it is unnecessary to seek where the magnet is actually situated.

By the arrangement shown in Figs. 18, 19, the movements across the playboard are independent from the longitudinal movements so that practically every movement may be made with the desired exactness. When point 80 is moved by the operating lever forwardly or rearwardly in Fig. 18 no pulling or releasing movement is imparted to cord 82 shown in Fig. 19. Likewise when point 80 is moved laterally in Fig. 19, no pull or release is imparted to cord 81 in Fig. 18, as will be readily understood. It is therefore possible to use the toy as a didactic play, e. g. for traffic instructions or the like.

It will be noted that in all embodiments of the invention as disclosed the playboard is in the form of a comparatively shallow box or container, in which the motion transmitting means for the magnet is mounted, and an operating lever is universally pivoted or fulcrumed in the top of the box so as to divide the lever into an exterior long arm and an interior short arm, said short arm operating motion amplifying transmitting mechanism to the magnet, thus providing sufficient range of movement for the magnet from a comparatively small range of movement of the short arm, while at the same time the exterior arm of the lever has sufficient leverage at the handle thereof to promote ease of operation.

The various forms of motion transmitting mechanisms operated by the control lever herein disclosed are designed to impart a substantially constant ratio of amplified movement of the magnet as compared with the movement of the lever. The range of movement of the lazytongs may be so chosen as to avoid the extremes of possible expansion and contraction thereof, at which intermediate range the amplifying ratio is substantially constant. The other forms of motion transmitting mechanism herein disclosed transmit constant amplification throughout their range of movement.

Many modifications will occur to those skilled in the art without departing from the spirit of the invention and the scope of the appended claims.

What I claim and desire to secure by Letters Patent of the United States is:

1. A toy playboard comprising a box of comparatively shallow depth having a bottom wall and a top wall on which magnetizable figures may freely move; a magnet movably mounted beneath said top wall, said magnet having sufficient strength to cause a magnetizable figure within the effective range of the magnetic field of said magnet to move therewith so as to follow the movements of the magnet as the latter is moved along the bottom surface of said top wall; a control lever universally pivoted on the top wall adjacent the field of movement of the figures thereon, said lever having an outer arm extending out exteriorly of said box and an inner arm extending into the interior of the box; and means connected to said inner arm and disposed in the interior of said box constructed and arranged to transmit to said magnet an amplified movement from the movement of said control lever to any desired position, so as to carry with it a figure to any desired position on the entire play surface of the playboard, said means comprising a lazytongs device comprising a pair of first arms pivotally connected together at one end and at their other ends pivoted to the extremities of the crossed links of the lazytongs device; said crossed links forming a series of pairs pivoted to one another at the mid-lengths thereof, the extremities of the first pair of crossed links being pivoted respectively to the ends of said first arms; a stationary pivot within the area of the first parallelogram of the lazytongs device, about which pivot the lazytongs is adapted to fulcrum; a pair of links articulated at one end to said stationary pivot and at the other ends thereof pivoted respectively to intermediate points on said first arms so as to form a smaller parallelogram therewith; and a pivotal connection between the extremity of said inner arm of the control lever and the pivotal junction of said first arms.

2. In a toy playboard having a top wall on which magnetizable figures may freely move, and a bottom wall for enclosing motion transmitting mechanism; a magnet movably mounted beneath said top wall, said magnet having sufficient strength to cause a magnetizable figure within the effective range of the magnetic field of said magnet to move therewith so as to follow the movements of the magnet as the latter is moved along the bottom surface of said top wall; a control lever universally pivoted on the board adjacent the field of movement of the figures thereon, said lever having an outer arm extending exteriorly of said board and an inner arm extending into the interior of the board; and means connected to said inner arm and disposed in the interior of said board and slidable on the bottom wall thereof constructed and arranged to transmit to said magnet an amplified movement from the movement of said control lever to any desired position, so as to carry with it a figure to any desired position on the entire play surface of the playboard; said universal pivot comprising a ball member mounted in a socket formed in the top of said playboard, said ball member being formed with a diametrical perforation therethrough, said control lever being composed of two separable portions, one of these portions being in the form of a socket member slidably engaged in said perforation, the inner extremity of the socket member being connected to said movement transmitting means and moving substantially coplanarly therewith, the other portion of the control lever being in the form of an elongated handle member engageable in said socket member in the operative position thereof, and removable from said socket member, so as to free the board from projections when required; said socket member constituting the said inner arm of the lever pivoted to said means for transmitting amplified movement to said magnet.

3. A magnetic toy as defined in claim 2, in which said movement transmitting means is in the form of a lazytongs device, the interior end of said socket member being pivotally connected to one extremity of said lazytongs device, and said magnet being mounted on the other extremity of said lazytongs device; and a stationary pivot on which said lazytongs device is fulcrumed between the ends thereof for transmitting an amplified movement to said magnet about said pivot.

4. A magnetic game comprising a playboard, a manual operating lever universally pivotally mounted in the top of said playboard, the inner arm of the lever extending into a chamber formed below the top of said playboard; a lazytongs device disposed in said chamber and pivotally connected at one end with the extremity of said inner arm; a magnet carried by the opposite end of the lazytongs device and disposed adjacent to the bottom surface of the top of said playboard; a stationary pivot disposed between the extremities of said lazytongs device; means for fulcruming said lazytongs about said pivot so as to transmit an amplified movement to said magnet when said one end of the lazytongs is pivotally actuated by the lever; said opposite end of the lazytongs comprising a series of lazytongs sections formed by links of reduced length, whereby the close approach of the magnet to the sides of said chamber is unhindered.

5. In a toy playboard having a top wall on which magnetizable figures may freely move; a magnet movably mounted beneath said top wall, said magnet having sufficient strength to cause a magnetizable figure within the effective range of the magnetic field of said magnet to move therewith so as to follow the movements of the magnet as the latter is moved along the bottom surface of said top wall; a control lever universally pivoted on the board adjacent the field of movement of the figures thereon, said lever having an outer arm extending exteriorly of said board and an inner arm extending into the interior of the board; and means connected to said inner arm and disposed in the interior of said board constructed and arranged to transmit to said magnet an amplified movement from the movement of said control lever to any desired position, so as to carry with it a figure to any desired position on the entire play surface of the playboard; said magnet being mounted on the end of the movement transmitting means remote from said connection to said lever, said magnet mounting comprising a cup, a compression spring within the cup, said magnet being seated in said cup over said spring and urged thereby toward the bottom surface of the top of said board.

6. In game apparatus comprising a gameboard; a movable element slidable relatively thereto, an operating lever mounted on said gameboard for universal pivotal movement relatively thereto about a point in a plane spaced from and parallel to the sliding surface of the gameboard; and means for transmitting an amplified movement to said movable element from the movement of said operating lever; said transmitting means comprising a lazytongs device slidable on said surface, said lazytongs being formed of a series of pairs of crossed links pivoted to one another at midlengths thereof and a pair of first arms pivotally connected together at one end and at their other ends pivoted respectively to the extremities of the first pair of crossed links to form a first parallelogram therewith; a stationary pivot attached to the play board within the area of the first parallelogram; a pair of links pivoted together at one end upon said stationary pivot and at their other ends pivoted respectively at intermediate points on said first arms so as to form a parallelogram of reduced size therewith; and means for universally connecting said operating lever to said first arms for imparting movement thereto so as to transmit an amplified movement to said movable element to sweep the entire play surface of the playboard.

7. A toy playboard comprising a box of comparatively shallow depth having a bottom wall and a top wall on which magnetizable figures may freely move; a magnet movably mounted beneath said top wall, said magnet having sufficient strength to cause a magnetizable figure within the effective range of the magnetic field of said magnet to move therewith so as to follow the movements of the magnet as the latter is moved along the bottom surface of said top wall; a control lever universally pivoted on the top wall adjacent the field of movement of the figures thereon, said lever having an outer arm extending out exteriorly of said board and an inner arm extending into the interior of the box; and means connected to said inner arm and disposed in the interior of said board constructed and arranged to transmit to said magnet an amplified movement from the movement of said control lever to any desired position, so as to carry with it a figure to any desired position on the entire play surface of the playboard, said means comprising a lazytongs device fulcrumed on a stationary pivot attached to said bottom wall, said lazytongs being formed with a first parallelogram, of reduced size, one jointed extremity of said parallelogram forming one extremity of said lazytongs being universally jointed with the extremity of said inner arm of the operating lever, the opposite jointed extremity of said parallelogram being pivoted on said stationary pivot and fulcruming said lazytongs thereon, the opposite extremity of said lazytongs carrying said magnet, said lazytongs adjacent said opposite extremity comprising a series of lazytong sections of reduced length, whereby the close approach of the magnets to the sides of said box is unhindered.

8. In game apparatus comprising a gameboard; a movable element slidable relatively thereto, an operating lever mounted on said gameboard for universal pivotal movement relative thereto about a point in a plane spaced from and parallel to the sliding surface of the gameboard; and means for transmitting an amplified movement to said movable element from the movement of said operating lever; said transmitting means comprising a lazytongs device slidable on said surface, said lazytongs being formed of a series of pairs of crossed links pivoted to one another at midlengths thereof and a pair of first arms pivotally connected together at one end and at their other ends pivoted respectively to the extremities of the first pair of crossed links to form a first parallelogram therewith; a stationary pivot attached to the gameboard within the area of the first parallelogram; a pair of links pivoted together at one end upon said stationary pivot and at their other ends pivoted respectively at intermediate points on said first arms so as to form a parallelogram of reduced size therewith; and means for universally connecting said operating lever to said first arms for imparting movement thereto so as to transmit an amplified movement to said movable element to sweep the entire play surface of the playboard, said operating lever being mounted in a ball movable in a socket formed in a support, said ball having a bore extending diametrically therethrough, said lever passing through said bore and slidable therein, whereby the end of the lever engaging the end of the lazytongs is maintained in the plane of the lazytongs in all positions of the lever.

9. Game apparatus as defined in claim 8, wherein said operating lever is composed of two telescoping parts, the portion passing through said bore comprising a sleeve or socket portion from which the other part of the lever may be removed, so as to remove projections from above the support when found desirable.

10. In play apparatus, a playboard comprising a box of comparatively shallow depth, a plurality of magnets mounted on slidable supports within the box, and means for imparting to each of said magnets two-dimensional control movements in a plane which is disposed parallel to the playboard, in such a way that the magnets are capable of sweeping the entire back side of the top wall of the playboard without interfering with each other, said means including for each magnet a set of lazytongs, a pair of links pivotally mounted on a stationary member in the interior of the box, said pivot being located within the area of the first parallelogram of the respective set of lazytongs, said links being connected respectively to the first arms of said first parallelogram at points intermediate of the lengths thereof and forming together with said first pair of arms of the lazytongs a parallelogram of reduced size, and a control lever universally pivoted at the top of the box so as to permit swinging in all directions and a universal joint for connecting the control lever to the joint of said first pair of arms.

11. A play apparatus, comprising a playboard, a plurality of magnets, and means for imparting to each of said magnets two-dimensional control movements in a plane which is disposed parallel to the playboard, in such a way that the magnets are capable of sweeping the entire back side of the playboard without interfering with each other, said means including for each magnet a set of lazytongs, one of the sets of lazytongs being provided with a pair of spacing posts for connecting the first pair of arms of said one set of lazytongs with the adjacent crossed links in such a way that the crossed links of said set of lazytongs are arranged adjacent to the playboard, a pair of links pivotally mounted on a stationary member of the apparatus to move in planes closely adjacent to the planes of movement of said first pair of arms and forming together with said first pair of arms of the lazytongs a link parallelogram, and a control lever including a stationary universal joint permitting its swinging in all directions and a universal joint for connecting the control lever to the joint of said first pair of arms.

12. A play apparatus, comprising a playboard, a bottom wall arranged parallel to the playboard, a plurality of magnets, and means for imparting to each of said magnets two-dimensional control movements in a plane which is disposed parallel to the playboard, in such a way that the magnets are capable of sweeping the entire back side of the playboard without interfering with each other, said means including for each magnet a set of lazytongs, one of the sets of lazytongs being provided with a pair of spacing posts for connecting the first pair of arms of said one set of lazytongs with the adjacent crossed links in such a way that the crossed links of the set of lazy tongs are arranged adjacent to the playboard, a pair of links pivotally mounted on the bottom wall to move in planes closely adjacent to the planes of movement of said first pair of arms and forming together with said first pair of arms of the lazy tongs a link parallelogram, and a control lever including a stationary universal joint permitting its swinging in all directions and a universal joint for connecting the control lever to the joint of said first pair of arms.

13. An apparatus for moving a plurality of figures in a horizontal plane, comprising a first frame including an at least substantially horizontal top board, side walls, a bottom wall, and an intermediate wall supported on and spaced from the bottom wall and spaced from the side walls, a compound slide rest in the form of a second rectangular frame slidably mounted on the intermediate wall in such a way that its upper leg is disposed adjacent to the top board and its lower leg is disposed below the intermediate wall while its side legs are disposed in the space between the side walls of the first frame and the intermediate wall, a first magnet unit slidably mounted in a slot in the upper leg of the second frame, a deflection roller and pull cable arrangement acting on said magnet unit and adapted to be operated from a plane adjacent to the lower leg of the second frame, a second magnet unit, means for moving said second magnet unit in such a way that its upper pole face is adapted to sweep the entire lower face of the board, and means for moving said compound slide rest and operating said deflection roller and pull cable arrangement in such a way that the upper pole face of the first magnet is adapted to sweep the entire lower face of the board without interfering with the movements of the second magnet.

14. A play apparatus comprising a substantially horizontal playboard, two magnets arranged below the playboard, means for transmitting control motions to one of said magnets, said one magnet being arranged in an upright position on the free end of the transmitting means and extending upwards to a level slightly spaced from the bottom surface of the playboard, a compound slide rest arrangement, including a thin strip from which the second magnet is suspended and extending below the same with its top pole disposed closely adjacent said bottom surface of the playboard, said strip being also located close to the bottom surface of the playboard, and means for transmitting control motions to said compound slide rest arrangement, including said strip, to enable the suspended magnet to sweep the bottom surface of the playboard without interfering with a similar sweep movement of the other magnet when actuated by its actuating means, the spacing of said second magnet from the bottom surface of the playboard being not substantially greater than the thickness of said thin strip.

15. A play apparatus, comprising a substantially horizontal playboard having a top wall, two magnets arranged below said top wall, a bottom wall parallelly arranged below said top wall, means mounted on the bottom wall for transmitting control motions to one of said magnets which is arranged on the free end of the transmitting means in an upright position slightly spaced from the bottom surface of said top wall, a two-dimensional guiding arrangement including a thin strip from which the second magnet is suspended to extend below said strip with its top pole closely adjacent said bottom surface, said strip being mounted for bodily movement closely adjacent said bottom surface, and means for transmitting control motions to said two-dimensional guiding arrangement, in such a way that the magnets are capable of sweeping the entire bottom surface of the top wall without interfering with each other, the spacing of said one magnet from the bottom surface of said top wall being not substantially greater than the thickness of said thin strip.

16. A play apparatus comprising a playboard formed of a comparatively shallow box having a top wall and a bottom wall; two separately operable magnets disposed within the box so disposed that their magnetic fields are capable of attracting and moving therewith movable magnetic objects freely disposed on the top surface of the playboard; two-dimensional guiding means having a flat thin portion closely adjacent the bottom surface of said top wall, movable in one direction, and suspending means slidable thereon for movement in a direction transverse thereto, from which suspending means one of said magnets is suspended to extend below said flat thin portion to move with said portion in one dimension of motion and to move with respect to said portion in another dimension of movement with its top pole surface closely adjacent the bottom surface of said top wall; motion transmitting means for transmitting amplified movement to said one magnet and said guiding means so as to cause said magnet to sweep the entire field of playing surface of said playboard; a separately operable amplified motion transmitting means disposed in a different plane from said first mentioned motion transmitting means for operating said second magnet to move the same so as to sweep the entire field of playing surface of the playboard without interfering with said guiding means for the first magnet, said second magnet extending inwardly toward said bottom surface and spaced therefrom a distance not substantially greater than the thickness of said thin portion, so as to provide the small clearance required to clear said guiding means and sufficiently close to said top wall to exert adequate magnetic force thereon.

17. A play apparatus as defined in claim 16, in which each of said motion transmitting means for said magnets comprises a lazytongs member fulcrumed on a stationary pivot, and means for connecting the extremity of the long arm of one of the lazytongs to the suspending means for moving the magnet therein in any desired two-dimensional direction, the extremity of the long arm of the other lazytongs member directly actuating the other magnet as aforesaid.

18. A play apparatus is defined in claim 17, in which an operating lever for each lazytongs member is universally pivoted at the top wall of said box, said lever having an inner arm thereof universally jointed to the extremity of the corresponding lazytongs member.

19. A play apparatus as defined in claim 18, in which the first parallelogram of the lazytongs member to which the operating lever is jointed is composed of shorter arms than the arms of the crossed links of the lazytongs, the joint of said first parallelogram opposite to the joint with the operating lever being pivoted on said stationary pivot.

20. A play apparatus, comprising a substantially horizontal playboard having a top wall, two magnets arranged below the top wall, a bottom wall and an intermediate wall parallelly arranged below said top wall, means mounted on the intermediate wall for transmitting control motions to one of said magnets which is arranged on the free end of the transmitting means in an upright position slightly spaced from the bottom surface of said top wall, a two-dimensional guiding arrangement including a thin strip from which the second magnet is suspended to extend below said strip with its top pole closely adjacent the bottom surface of said top wall, said strip being mounted for bodily movement closely adjacent the bottom surface of said top wall, and means mounted below the intermediate wall for transmitting control motions to said two-dimensional guiding arrangement, in such a way that the magnets are capable of sweeping the entire back side of the playboard without interfering with each other, the spacing of said one magnet from the bottom surface of said top wall being not substantially greater than the thickness of said thin strip.

References Cited in the file of this patent

UNITED STATES PATENTS

| | | |
|---|---|---|
| 1,190,215 | Becker | July 4, 1916 |
| 2,181,220 | Waasdorp | Nov. 28, 1939 |
| 2,254,967 | Larkins | Sept. 2, 1941 |
| 2,263,115 | Winter | Nov. 18, 1941 |
| 2,651,140 | Kovac | Sept. 8, 1953 |
| 2,663,967 | Mathis | Dec. 29, 1953 |

FOREIGN PATENTS

| | | |
|---|---|---|
| 607,903 | Great Britain | Sept. 7, 1948 |
| 144,036 | Australia | Oct. 31, 1951 |